United States Patent
Deng (10) Patent No.: US 9,729,049 B2
(45) Date of Patent: Aug. 8, 2017

(54) SUPPLY VOLTAGE GENERATING CIRCUIT AND SWITCHING POWER SUPPLY

(71) Applicant: Silergy Semiconductor Technology (Hangzhou) Ltd., Hangzhou (CN)

(72) Inventor: Jian Deng, Hangzhou (CN)

(73) Assignee: SILERGY SEMICONDUCTOR TECHNOLOGY (HANGZHOU) LTD., Hangzhou (CN)

( * ) Notice: Subject to any disclaimer, the term of this patent is extended or adjusted under 35 U.S.C. 154(b) by 0 days.

(21) Appl. No.: 14/788,044

(22) Filed: Jun. 30, 2015

(65) Prior Publication Data

US 2016/0006339 A1    Jan. 7, 2016

(30) Foreign Application Priority Data

Jul. 1, 2014    (CN) .......................... 2014 1 0309928

(51) Int. Cl.
    *H02M 3/155*    (2006.01)
    *H02M 3/335*    (2006.01)
    *H02M 1/00*     (2006.01)

(52) U.S. Cl.
    CPC ....... *H02M 3/155* (2013.01); *H02M 3/33523* (2013.01); *H02M 2001/0006* (2013.01)

(58) Field of Classification Search
    CPC .................. H02M 1/00; H02M 1/096; H02M 3/155–3/1588; H02M 7/06; H02M 2001/0006
    See application file for complete search history.

(56) References Cited

U.S. PATENT DOCUMENTS

| | | | |
|---|---|---|---|
| 6,775,164 B2 * | 8/2004 | Wong .................... | H02M 3/156 363/147 |
| 8,502,511 B1 * | 8/2013 | Kung .................. | H02M 3/1588 323/225 |

(Continued)

FOREIGN PATENT DOCUMENTS

| CN | 103607825 A | 2/2014 |
|---|---|---|
| CN | 103760408 A | 4/2014 |
| CN | 102723856 B | 6/2014 |

*Primary Examiner* — Fred E Finch, III
*Assistant Examiner* — Yusef Ahmed
(74) *Attorney, Agent, or Firm* — Westman, Champlin & Koehler, P.A.

(57) ABSTRACT

The present disclosure relates to a supply voltage generating circuit and a switching power supply having the circuit. The supply voltage generating circuit provides a supply voltage for a power terminal of a control circuit in the switching power supply. The supply voltage generating circuit includes a switching circuit, a unidirectional conduction circuit and an energy storage circuit. In a time period during which a main power transistor is turned off, the switching circuit is turned off and a rectifying device provides a current to the energy storage circuit through the unidirectional conduction circuit, in a case that the supply voltage is smaller than a predetermined voltage reference; and the switching circuit is turned on and the current output from the rectifying device flows to the switching circuit, in a case that the supply voltage is larger than or equal to the predetermined voltage reference. When the supply voltage generating circuit is used in a switching power supply, the control circuit has improved controllability for supplying electric energy, and the switching power supply has an increased integration level and a simplified circuit structure, and will not be adversely influenced by resonance.

12 Claims, 6 Drawing Sheets

(56) References Cited

U.S. PATENT DOCUMENTS

| | | | | |
|---|---|---|---|---|
| 2003/0235059 A1* | 12/2003 | Perry | | H02M 3/33592 363/21.06 |
| 2005/0093486 A1* | 5/2005 | Storm | | H05B 33/0815 315/291 |
| 2006/0119281 A1* | 6/2006 | Nishikawa | | H02M 3/3353 315/209 R |
| 2006/0279967 A1* | 12/2006 | Shao | | H02M 1/36 363/21.01 |
| 2007/0014133 A1* | 1/2007 | Shao | | H02H 7/1252 363/52 |
| 2010/0244726 A1* | 9/2010 | Melanson | | H02M 3/33523 315/291 |
| 2011/0291634 A1* | 12/2011 | Takata | | H02M 1/32 323/285 |
| 2012/0293219 A1* | 11/2012 | Bai | | H02M 3/1588 327/109 |
| 2013/0088898 A1* | 4/2013 | Gao | | H02M 3/335 363/21.16 |
| 2013/0148387 A1* | 6/2013 | Ren | | H02M 1/36 363/21.16 |
| 2013/0215649 A1* | 8/2013 | Huang | | H02M 3/33523 363/21.17 |
| 2014/0055168 A1* | 2/2014 | Deng | | H02M 1/00 327/108 |
| 2014/0159605 A1* | 6/2014 | Deng | | H02M 1/4258 315/200 R |
| 2014/0167724 A1* | 6/2014 | Deng | | H02M 1/08 323/311 |
| 2014/0177284 A1* | 6/2014 | Nakano | | H02M 1/36 363/19 |
| 2014/0254207 A1* | 9/2014 | Hosotani | | H02M 3/33569 363/21.01 |
| 2014/0362609 A1* | 12/2014 | Bisschop | | H02M 3/33523 363/21.12 |
| 2014/0362612 A1* | 12/2014 | Shi | | H02M 3/33523 363/21.16 |
| 2015/0003118 A1* | 1/2015 | Shin | | H02M 3/33507 363/21.12 |
| 2015/0145452 A1* | 5/2015 | Sun | | H02P 6/14 318/400.26 |
| 2015/0214829 A1* | 7/2015 | Xu | | H02M 1/083 363/21.03 |
| 2015/0280578 A1* | 10/2015 | Huang | | H02M 1/32 363/21.12 |
| 2016/0181929 A1* | 6/2016 | Chen | | H02M 3/33507 363/21.18 |
| 2016/0344294 A1* | 11/2016 | Zhang | | H02M 1/36 |

* cited by examiner

SUPPLY VOLTAGE GENERATING CIRCUIT AND SWITCHING POWER SUPPLY

CLAIM OF PRIORITY

This application claims priority to Chinese Application No. 201410309928.8, filed Jul. 1 2014 (published as CN 104038031 A), which is hereby incorporated by reference.

BACKGROUND OF THE INVENTION

Field of the Invention

The present disclosure relates to the field of power electronics, and more particularly, to a supply voltage generating circuit and a switching power supply.

Description of the Related Art

With rapid development in electronic information industry, switching power supplies are widely utilized in various fields, such as computers, electrical equipment, instrumentation, light-emitting diodes (LEDs), medical devices, military equipment and so on. A conventional switching power supply has a circuit structure including a power stage circuit and a control circuit and a supply voltage generating circuit which supplies electric energy to the control circuit.

Figure 1A:
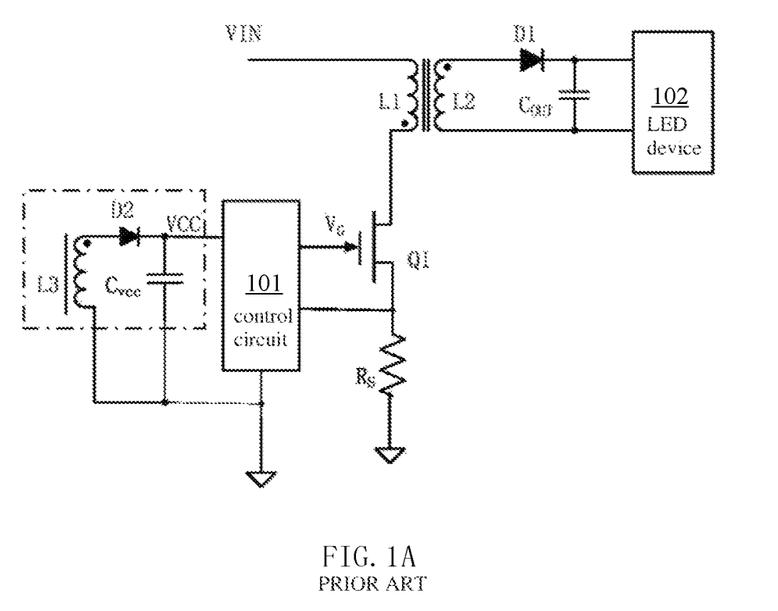
FIG. 1A is a schematic circuit diagram of a switching power supply according to the prior art.
Figure 1B:
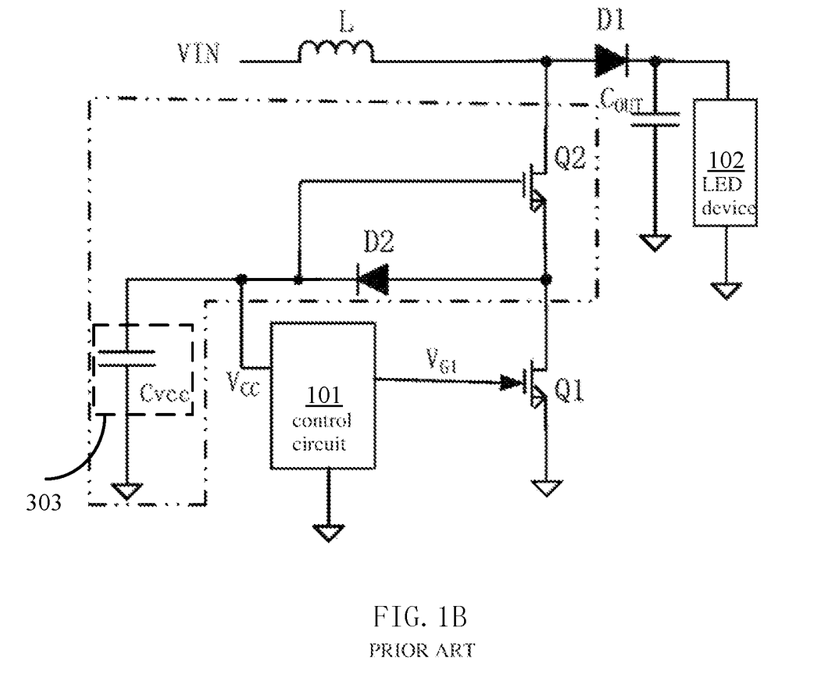
FIG. 1B is a schematic circuit diagram of another switching power supply according to the prior art.

FIG. 1A and FIG. 1B are schematic diagrams showing a conventional switching power supply, where a dashed box indicates a supply voltage generating circuit.

As shown in FIG. 1A, the switching power supply includes a transformer consisting of a primary winding L1 and a secondary winding L2, a first diode D1, a load-side capacitor $C_{OUT}$, a first switch Q1, a first resistor RS, a control circuit 101, a power capacitor $C_{VCC}$, an auxiliary winding L3, and a second diode D2. Here, the switching power supply is used for supplying electric energy to an LED device 102. The main circuit has a flyback isolation-type topology, in which the supply voltage generating circuit for supplying electric energy to the control circuit 101 includes the auxiliary winding L3 electrically coupling to the transformer, the second diode D2 and the power capacitor $C_{VCC}$. The power capacitor $C_{VCC}$ has one terminal being electrically coupled to a non-dotted terminal of the auxiliary winding and the other terminal being electrically coupled to the dotted terminal of the auxiliary winding through the second diode D2. The supply voltage generating circuit receives electric energy from the power stage circuit by means of the auxiliary winding, charges the power capacitor $C_{VCC}$, and then provides a supply voltage $V_{CC}$ to the control circuit 101 by means of the power capacitor $C_{VCC}$.

However, the transformer has a complex structure and increased manufacture cost because the auxiliary winding L3 must be included in the circuit.

As shown in FIG. 1B, the switching power supply includes a source-side driving circuit which is self-powered. The switching power supply includes a first inductor L, a first diode D1, an output capacitor $C_{OUT}$, a second switch Q2, a first switch Q1, a second diode D2, a control circuit 101, and a power capacitor $C_{VCC}$. The supply voltage generating circuit in the switching power supply includes the second switch Q2 and the second diode D2. When the supply voltage generating circuit supplies electric energy to the control circuit 101, voltage variation at a source side of the second switch Q2 is utilized for controlling on and off states, without the need for an auxiliary winding. When the second switch Q2 is turned on, the power capacitor $C_{VCC}$ is charged through a drain-source parasitic capacitance of the second switch Q2 and through the second diode D2, and then supplies electric energy to the control circuit 101.

However, the circuit scheme shown in FIG. 1B has the disadvantage that it may not be able to provide the supply voltage for the control circuit 101, because the second switch Q2 has a drain-source parasitic capacitance too small to ensure that the power capacitor $C_{VCC}$ is charged to a large voltage value when an input voltage $V_{IN}$ has a small value. Moreover, the second switch Q2 has a source being grounded through the first switch Q1, and as a result, it cannot be turned off completely. The circuit also has the problem of easily resonating in actual operation.

BRIEF DESCRIPTION OF THE INVENTION

In view of this, the present disclosure provides a supply voltage generating circuit for solving the problem of easily resonating in actual operation in a conventional switching power supply. The present disclosure also provides a switching power supply including the supply voltage generating circuit.

For this purpose, the following circuit scheme is proposed.

According to one aspect of the present disclosure, there is provided a supply voltage generating circuit for providing a supply voltage to a power terminal of a control circuit in a switching power supply which has a power stage circuit comprising a main power transistor and a rectifying device, the supply voltage generating circuit comprising: a switching circuit, a unidirectional conduction circuit and an energy storage circuit;

wherein the switching circuit has a first terminal being electrically coupled to a first terminal of the unidirectional conduction circuit, and a second terminal being coupled to a first ground, and an intermediate node between the first terminal of the switching circuit and the first terminal of the unidirectional conduction circuit is electrically coupled to a current output terminal of the rectifying device, the unidirectional conduction circuit has a second terminal being coupled to the first ground through the energy storage circuit, in a time period during which the main power transistor is turned off, the switching circuit is turned off and the rectifying device provides a current to the unidirectional conduction circuit for charging the energy storage circuit, in a case that the supply voltage is smaller than a predetermined voltage reference, and the switching circuit is turned on and the current output from the rectifying device is not used for charging the energy storage circuit, in a case that the supply voltage is larger than or equal to the predetermined voltage reference.

the supply voltage is a voltage produced by the energy storage circuit.

Preferably, in the above supply voltage generating circuit, the switching circuit may comprise a third switch having a first terminal as the first terminal of the switching circuit and a second terminal as the second terminal of the switching circuit.

Preferably, in the above supply voltage generating circuit, the third switch may be a transistor having a first electrode terminal as the first terminal of the third switch and a second electrode terminal as the second terminal of the third switch.

Preferably, in the above supply voltage generating circuit, the unidirectional conduction circuit may comprise a first diode having an anode as the first terminal of the unidirectional conduction circuit, and a cathode as the second terminal of the unidirectional conduction circuit.

Preferably, in the above supply voltage generating circuit, the unidirectional conduction circuit may comprise a capacitor having a first terminal as the first terminal of the energy storage circuit and a second terminal as the second terminal of the energy storage circuit.

Preferably, in the above supply voltage generating circuit, the switching circuit, the energy storage circuit and the control circuit are electrically coupled to the first ground.

According to another aspect of the present disclosure, there is provided a switching power supply, comprising a power stage circuit having a main power transistor and a rectifying device, and a control circuit, wherein the switching power supply further comprises the above supply voltage generating circuit, the supply voltage generating circuit provides a supply voltage to a power terminal of the control circuit, the control circuit controls on and off states of the main power transistor of the power stage circuit to generate an electric output signal at an output terminal of the switching power supply.

Preferably, in the above switching power supply, the main power transistor and the control circuit are electrically coupled to a first ground.

Preferably, in the above switching power supply, the power stage circuit may have a boost-type topology or a buck-type topology or a boost-buck-type topology.

Preferably, in the above switching power supply, the electric output signal may be a constant-voltage signal or a constant-current signal.

Preferably, in the above switching power supply, the rectifying device is a first diode with a cathode as the current output terminal.

According to yet another aspect of the present disclosure, there is provided a supply voltage generating method for providing a supply voltage to a control circuit being configured to control a main power transistor in a switching power supply, comprising:

in an on time interval of the main power transistor, providing the supply voltage to the control circuit;

in an off time interval of the main power transistor, determining whether the current supply voltage is less than a predetermined voltage reference;

when the current supply voltage is not less than the predetermined voltage reference, providing the supply voltage to the control circuit;

when the current supply voltage is less than the predetermined voltage reference, increasing the current supply voltage by a freewheeling current of the switching power supply until the current supply voltage reaches the predetermined voltage reference, and providing the supply voltage to the control circuit.

Preferably, in the above supply voltage generating method, when the current supply voltage is not less than the predetermined voltage reference, controlling the freewheeling current flowing to a first ground through a switching circuit.

Preferably, in the above supply voltage generating method, when the current supply voltage is less than the predetermined voltage reference, controlling the freewheeling current flowing to an energy storage circuit through a unidirectional conduction circuit, to increase the current supply voltage.

Preferably, in the above supply voltage generating method, the energy storage circuit is a capacitor being coupled in parallel with the control circuit.

Preferably, in the above supply voltage generating method, the unidirectional conduction circuit is a diode.

Preferably, in the above supply voltage generating method, the switching circuit is a transistor.

Preferably, in the above supply voltage generating method, the switching circuit, the energy storage circuit and the control circuit are coupled to the first ground.

It can be understood from the above circuit schemes that the supply voltage generating circuit in the present disclosure, when used in the switching power supply, in a time period during which a main power transistor is turned off, the switching circuit is turned off and a rectifying device provides a current to the energy storage circuit through the unidirectional conduction circuit, in a case that the supply voltage is smaller than a predetermined voltage reference; and the switching circuit is turned on and the current output from the rectifying device flows to the switching circuit instead of the unidirectional conduction circuit, in a case that the supply voltage is larger than or equal to the predetermined voltage reference. After the main power transistor of the power stage circuit is turned off, a freewheeling current is provided to the energy storage circuit through the rectifying device and the in a case that the control circuit needs electric energy; and the switching circuit is turned on to stop the freewheeling current flowing to the energy storage circuit by in a case that the control circuit does not need electric energy. When the supply voltage generating circuit is used in the switching power supply, the control circuit has improved controllability for supplying electric energy, and the switching power supply has an increased integration level and a simplified circuit structure, and will not be adversely influenced by resonance.

BRIEF DESCRIPTION OF THE DRAWINGS

Those technical solutions according to embodiments of the present disclosure and the prior art will be apparent when they are described in connection with appended drawings which are described briefly hereinbelow. It will be obvious to one skilled in the art that the following appended drawings show only some embodiments of the present disclosure. Other appended drawings can be obtained from these appended drawings without the need for creative work.

DETAILED DESCRIPTION OF EMBODIMENTS OF THE INVENTION

Those embodiments of the present disclosure will be described clearly and completely in connection with appended drawings. It is apparent that the embodiments described hereinbelow are only some but not all of the embodiments of the present disclosure. All of other embodiments, which are obtained by one skilled in the art from the embodiments described hereinbelow without the need for creative work, will fall within the scope of the present disclosure.

Figure 2:
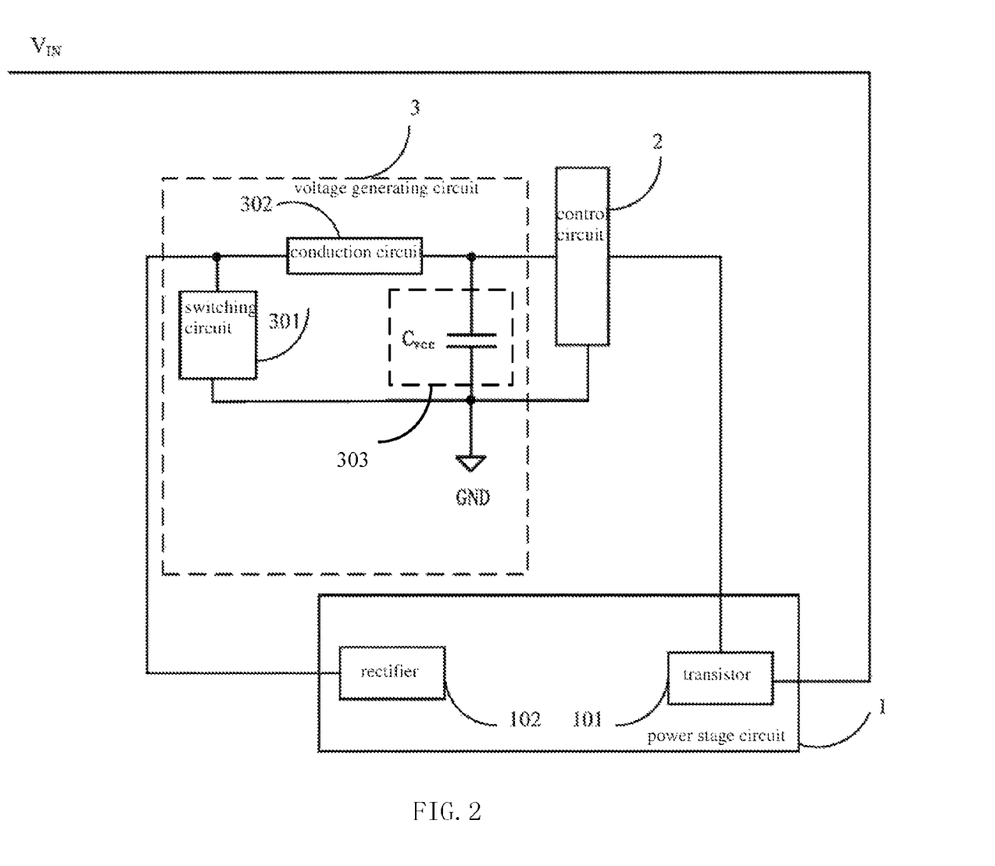
FIG. 2 is a schematic circuit diagram of a supply voltage generating circuit according to an embodiment of the present disclosure.

FIG. 2 is a schematic circuit diagram of a supply voltage generating circuit according to an embodiment of the present disclosure.

A supply voltage generating circuit provides a supply voltage to a power terminal of a control circuit 2 in a switching power supply which has a power stage circuit 1 including a main power transistor 101 and a rectifying device 102. The supply voltage generating circuit 3 includes a switching circuit 301, a unidirectional conduction circuit 302 and an energy storage circuit 303.

The switching circuit 301 has a first terminal being electrically coupled to a first terminal of the unidirectional conduction circuit 302, and a second terminal being coupled to a first ground. An intermediate node between the first terminal of the switching circuit 301 and the first terminal of the unidirectional conduction circuit 302 is electrically coupled to a current output terminal of the rectifying device 102 in the power stage circuit 1.

The unidirectional conduction circuit 302 has a second terminal being coupled to the first ground through the energy storage circuit 303.

In a time period during which the main power transistor 101 in the power stage circuit 1 is turned off, the switching circuit 301 is turned on or off by a control signal representing the supply voltage in a manner as described below. In a case that the supply voltage is smaller than a predetermined voltage reference, the control signal turns off the switching circuit 301 so that the rectifying device 102 outputs a current to the energy storage circuit 303 through the unidirectional conduction circuit 302. In a case that the supply voltage is larger than or equal to the predetermined voltage reference, the control signal turns on the switching circuit 301 so that the current output from the rectifying device 102 flows to the switching circuit 301 instead of to the energy storage circuit 303.

The supply voltage is a voltage produced by the energy storage circuit 303.

It can be understood from the above circuit schemes that the supply voltage generating circuit 301 in the present disclosure, when used in the switching power supply, in a time period during which a main power transistor 101 is turned off, the switching circuit 301 is turned off and a rectifying device 102 provides a current to the energy storage circuit 303 through the unidirectional conduction circuit 302, in a case that the supply voltage is smaller than the predetermined voltage reference; and the switching circuit 301 is turned on and the current output from the rectifying device 102 flows to the switching circuit 301 instead of to the energy storage circuit 303, in a case that the supply voltage is larger than or equal to the predetermined voltage reference. After the main power transistor 101 in the power stage circuit 1 is turned off, a freewheeling current is provided by the rectifying device 102 to the energy storage circuit 303 through the unidirectional conduction circuit 302 in a case that the control circuit 2 needs electric energy, that is, the voltage at the power terminal is smaller than the predetermined voltage reference; the freewheeling current flows to a first ground through the switching circuit 301 which is turned on, instead of the unidirectional conduction circuit 302, so that the unidirectional conduction circuit 302 blocks the current from flowing to the energy storage circuit 303, in a case that the control circuit 2 does not need electric energy, that is, the voltage at the power terminal is larger than or equal to the predetermined voltage reference. Accordingly, the supply voltage generating circuit 3 according to the present disclosure improves controllability of the control circuit 2 for supplying electric energy. It should be noted that the switching circuit 301 may be turned on or off in the time period during which the main power transistor 101 in the power stage circuit 1 is turned on, without any substantial effect on implementation of the present disclosure.

It can be understood that control circuits of different types may have different operating voltages. The predetermined voltage reference according to present disclosure should be modified in accordance with a rated operating voltage of the control circuits so that the predetermined voltage reference matches the rated operating voltage of the control circuits.

Further, the switching circuit 301, the energy storage circuit 303 and the control circuit 2 may be electrically coupled to a common ground (i.e., referred as the first ground) according to the embodiment of the present disclosure. Because the unidirectional conduction circuit 302 is electrically coupled to the first ground through the energy storage circuit 303, the switching circuit 301 and the unidirectional conduction circuit 302 may be integrated into a chip together with the control circuit 2. Thus, the switching power supply will have an increased integration level and a reduced size.

It can be understood that the switching circuit 301 may be of different types, and may be any circuit which can be turned on and off under the control of a control signal. For example, the switching circuit 301 may include a third switch which can be turned on and off under the control of a control signal. The third switch has a first terminal as the first terminal of the switching circuit and a second terminal as the second terminal of the switching circuit.

Figure 3:
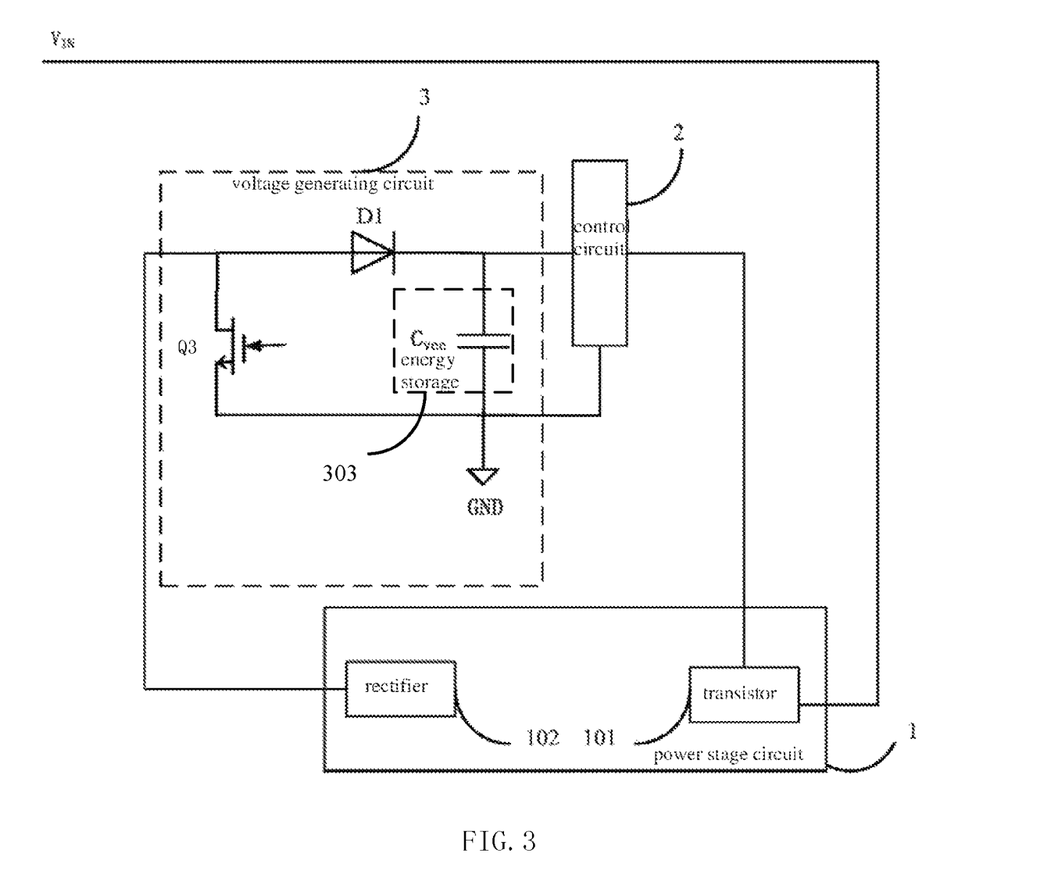
FIG. 3 is a schematic circuit diagram of a supply voltage generating circuit according to another embodiment of the present disclosure.

FIG. 3 is a schematic circuit diagram of a supply voltage generating circuit according to another embodiment of the present disclosure.

As shown in FIG. 3, the third switch may be a transistor Q3 having a first electrode terminal as the first terminal of the third switch and a second electrode terminal as the second terminal of the third switch.

The transistor Q3 may be any type as required by a user. When the transistor Q3 is a field effect transistor, the first electrode terminal is one of source and drain, and the second electrode terminal is the other of the source and the drain. The transistor may be activated by a high-level signal or by a low-level signal. Preferably, the transistor Q3 here is activated by the high-level signal, the drain of which is the first terminal of the switching circuit, and the source of which is the second terminal of the switching circuit.

As shown in FIG. 3, the unidirectional conduction circuit 302 according to the embodiment of the present disclosure may be of any type which ensures that the current flows only in a direction from the rectifying device 102 to the energy storage circuit 303. For example, the supply voltage generating circuit may include a first diode D1 with an anode as the first terminal of the unidirectional conduction circuit 302 and a cathode as the second terminal of the unidirectional conduction circuit 302. Alternatively, the unidirectional conduction circuit 302 may consist of a diode and a resistor which are connected in series.

As shown in FIG. 3, the energy storage circuit 303 according to the embodiment of the present disclosure may be of any type which is used to store energy by receiving the current from the rectifying device 102. For example, the supply voltage generating circuit may include a capacitor Cvcc with a first terminal as the first terminal of the energy storage circuit 302 and a second terminal as the second terminal of the energy storage circuit 302.

Further, the source of the transistor Q3, and the energy storage circuit $C_{VCC}$ according to the embodiment of the present disclosure may be electrically coupled to a ground terminal (i.e., the first ground) of the control circuit 2, as shown in FIG. 3. The transistor Q3 and the first diode D1 may be integrated into a chip together with the control circuit 2. Thus, the switching power supply will have an increased integration level, a reduced size and a simplified circuit structure. Further, the source of the transistor Q3 is grounded directly. When the transistor Q3 receives a control signal for indicating an off operation at its gate, it will be turned off completely without occurrence of resonance. The supply voltage generating circuit is not adversely influenced by resonance, and has improved stability.

Regarding the supply voltage generating circuit shown in FIG. 2, the present disclosure also relates to a switching power supply including the supply voltage generating circuit according to any of the embodiments of the present disclosure. The switching power supply includes a power stage circuit 1 and a control circuit 2. The power stage circuit 1 includes a main power transistor 101 and a rectifying device 102. The switching power supply further includes the supply voltage generating circuit 3 according to any of the embodiments of the present disclosure.

The supply voltage generating circuit 3 provides a supply voltage to a power terminal of the control circuit 2.

The control circuit 2 controls on and off states of the main power transistor of the power stage circuit 1 for energy conversion, so as to generate an electric output signal at an output terminal of the switching power supply.

It can be understood from the technical solutions according to the embodiments of the present disclosure that in a time period during which the main power transistor 101 is turned off when the switching power supply operates, the supply voltage generating circuit 3 provides the supply voltage to the power terminal of the control circuit 2 in a case that the control circuit 2 needs electric energy, and the supply voltage generating circuit 3 does not supply electric energy to the control circuit 2 in a case that the control circuit 2 does not need electric energy. Thus, the control circuit 2 of the switching power supply can be supplied with electric energy in a controllable manner to avoid insufficient or excess electric energy to be supplied. Furthermore, the switching power supply will have a simplified circuit structure, an increased integration level and a reduced size. Moreover, the main power transistor 101 and the control circuit 2 may be electrically coupled to a common ground (i.e., the first ground). The main power transistor 101 may be turned off completely when the main power transistor 101 is turned off by the control circuit 2, without occurrence of resonance. The switching power supply is not adversely influenced by resonance, and has improved stability.

To control the switching circuit 301, the embodiment of the present disclosure may have, but not must have, a controller. The controller has a first terminal which is electrically coupled to the power terminal of the control circuit 2 and a second terminal which is electrically coupled to a control terminal of the switching circuit 301. The controller provides a predetermined voltage reference. The controller operates in such a manner in a time period during which the main power transistor 101 is turned off, the switching circuit 301 is turned off in a case that the supply voltage is smaller than the predetermined voltage reference, and the switching circuit 301 is turned on in a case that the supply voltage is larger than or equal to the predetermined voltage reference. Also, the controller may be integrated into the same chip as the control circuit so as to increase an integrated level.

The rectifying device 102 may be a second diode with a cathode as the current output terminal.

Figure 4:
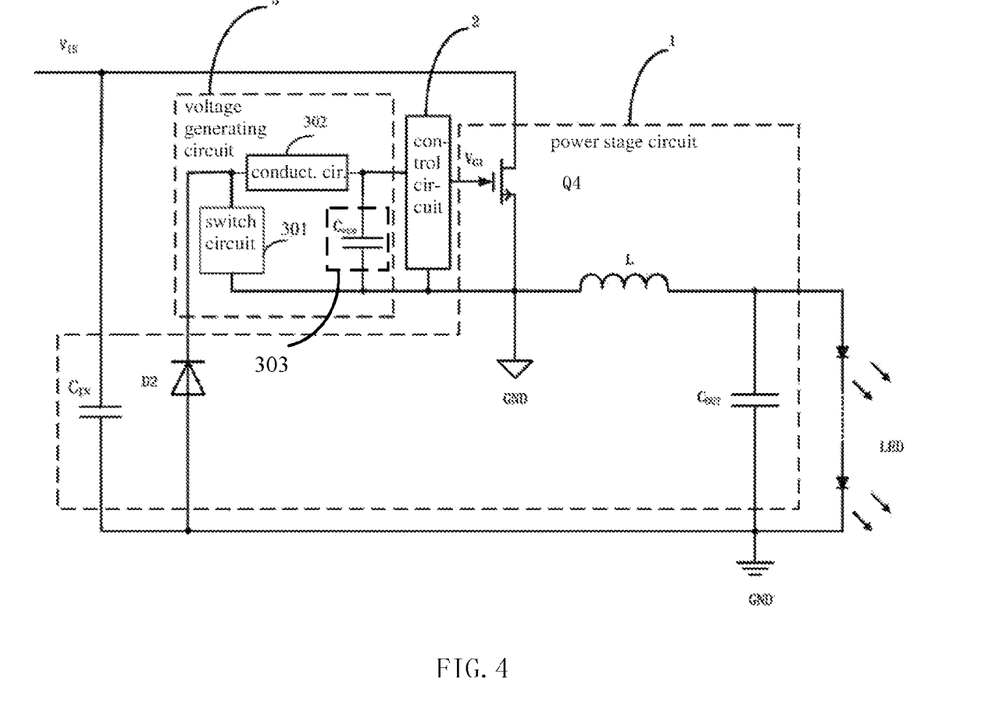
FIG. 4 is a schematic circuit diagram of a switching power supply according to another embodiment of the present disclosure.

FIG. 4 is a schematic circuit diagram of a switching power supply according to another embodiment of the present disclosure.

Figure 5:
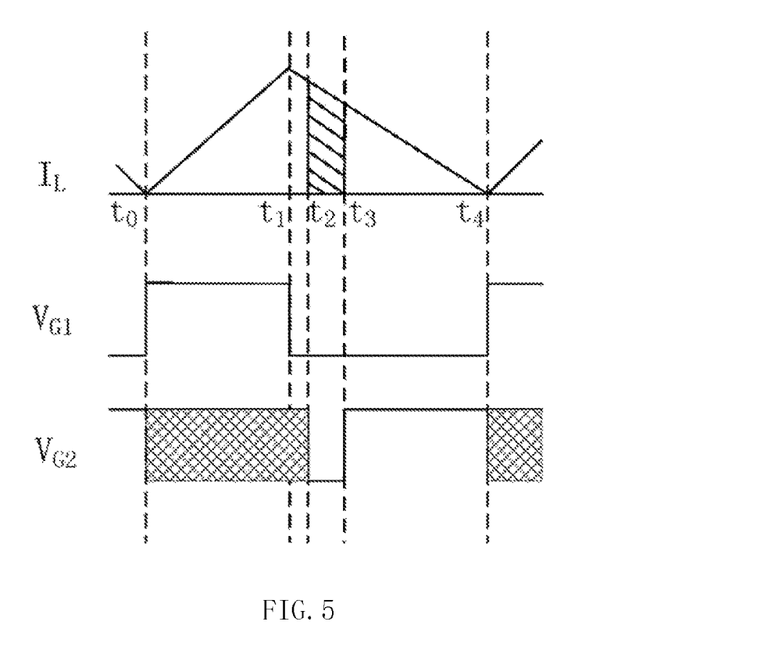
FIG. 5 shows example operation waveform diagrams of the switching power supply shown in FIG. 4.

FIG. 5 shows example operation waveform diagrams of the switching power supply shown in FIG. 4.

It can be understood that the power stage circuit 1 in the switching power supply according to the embodiment of the present disclosure may have different circuit schemes. For example, the power stage circuit 1 may have a boost-type topology or a buck-type topology, or may be of other types. The power stage circuit may include a main power transistor 101 and a rectifying device 102. The main power transistor 101 may be a transistor. In the embodiment, the main power transistor 101 is a field effect transistor Q4 (i.e. the main power transistor Q4), and the rectifying device 102 is a second diode D2. To illustrate the whole structure of the switching power supply, the switching power supply according to the embodiment of the present disclosure is described with a buck-type topology as an example. It is apparent that the circuit structure shown in FIG. 4 is only one of various buck-type power stage circuits. The buck-type power stage circuit 1 in the switching power supply show in FIG. 4 is given only as an example.

The second diode D2 has a cathode which is electrically coupled to the anode of the first diode D1 in the supply voltage generating circuit 3.

The main power transistor Q4 has a first electrode terminal which is electrically coupled to an input voltage $V_{IN}$, a control terminal which is electrically coupled to an output terminal of the control circuit 2, and a second electrode terminal which is grounded.

An inductor L has a first terminal which is electrically coupled to the second electrode terminal of the main power transistor Q4, and a second terminal which is electrically coupled to an anode of the second diode D2 through a load (LED).

A load-side capacitor $C_{OUT}$ has a first terminal which is electrically coupled to the second terminal of the inductor L, and a second terminal which is electrically coupled to the anode of the second diode D2.

Further, operating principles of the switching power supply including the supply voltage generating circuit 3 will be discussed with reference to FIG. 5.

In FIG. 5, $I_L$ denotes an inductor current, $V_{G1}$ denotes a control signal from the control circuit, and $V_{G2}$ denotes a control signal at the control terminal of the switch circuit 301.

The control signal $V_{G1}$ from the control circuit 2 is firstly valid at a high level. In a time period $t_0$-$t_1$ shown in FIG. 5, the main power transistor Q4 is turned on, and the input voltage V from an input voltage source supplies electric energy to the inductor L through the main power transistor Q4. The inductor current $I_L$ is increased continuously and does not flow through the second diode D2. The switching circuit 301 in the supply voltage generating circuit 3 may be either turned on or turned off in a time period during which the main power transistor Q4 is turned on. On and off states of the switching circuit 301 are not controlled in this time period because they are irrelevant to the operation state of the power stage circuit 1;

As shown in a time period $t_1$-$t_2$ of $V_{G2}$ in FIG. 5, the control signal $V_{G1}$ from the control circuit 2 is then invalid at a low level. In a time period $t_3$-$t_4$ shown in FIG. 5, the main power transistor Q4 is turned off, and the inductor current $I_L$ continues to flow due to the inductor L and the second diode D2. The inductor current $I_L$ decreases continuously. In a time period during which the main power transistor Q4 is turned off, that is, during which the inductor current $I_L$ decreases ($t_1$-$t_4$), the switching circuit 301 is turned off by a control signal which is invalid at a low level in a case that the control circuit 2 needs electric energy ($t_2$-$t_3$). Thus, the inductor current $I_L$ is controlled to be supplied to the energy storage circuit 303 through the second diode D2 and the unidirectional conduction circuit so as to provide an operating voltage for the control circuit 2. The supply voltage of the control circuit 2 is a voltage produced by the energy storage circuit 303.

In a time period during which a freewheeling current of the inductor L flows ($t_1$-$t_4$), the control signal of the switching circuit 301 is valid at a high level and the switching circuit 301 is turned on in a case that the control circuit 2 does not need electric energy, such as in the time periods $t_1$-$t_2$ and $t_3$-$t_4$. Thus, the inductor current $I_L$ flows to the first ground through the second diode D2 and the switch circuit 301, instead of the unidirectional conduction circuit 302. The energy storage circuit 303 is not charged or stops to be charged. The supply voltage generating circuit 3 according to the embodiment of the present disclosure introduces controllability of the control circuit 2 for supplying electric energy.

The control signal is provided to the switching circuit 301 to control an operation state of the switching circuit 301 in accordance with electric energy which is needed by the control circuit. As mentioned above, the control signal may be generated in accordance with the supply voltage at the power terminal of the control circuit 2. The control signal is valid at a high level in case that the supply voltage reaches a maximum value of the voltage at which the control circuit operates normally, so that the supply voltage generating circuit 3 stops to supply electric energy to the control circuit 2. The control signal is invalid at a low level in a case that the supply voltage decreases to a minimum value of the voltage at which the control circuit operates normally, so that the supply voltage generating circuit 3 starts to supply electric energy to the control circuit 2. Electric energy can be supplied in any time period of the time period during which the freewheeling current of the inductor current flows. That is, the time period $t_2$-$t_3$ shown in FIG. 5 may be any time period within the time period $t_1$-$t_4$. The supply voltage generating circuit 3 provides the supply voltage for the control circuit 2 so that the control circuit 2 operates normally and outputs the control signal $V_{G1}$ which controls on and off states of the main power transistor Q2. A switching operation of the main power transistor Q4 converts electric energy and generates a constant electric output signal at the output terminal of the switching power supply. The constant electric output signal may be either a constant-voltage signal or a constant-current signal.

Accordingly, the switching power supply including the supply voltage generating circuit according to the embodiment of the present disclosure utilizes the freewheeling current which is generated by the inductor and the rectifying device after the power stage circuit is turned off. The freewheeling current charges the energy storage circuit, in a case that the control circuit needs electric energy, and stops to charge the energy storage circuit by flowing to the first ground through the switching circuit in an on state, instead of the unidirectional conduction circuit, in a case that the control circuit does not need electric energy. Thus, the supply voltage generating circuit according to the embodiment of the present disclosure introduces controllability of the control circuit 2 for supplying electric energy.

Figure 6:
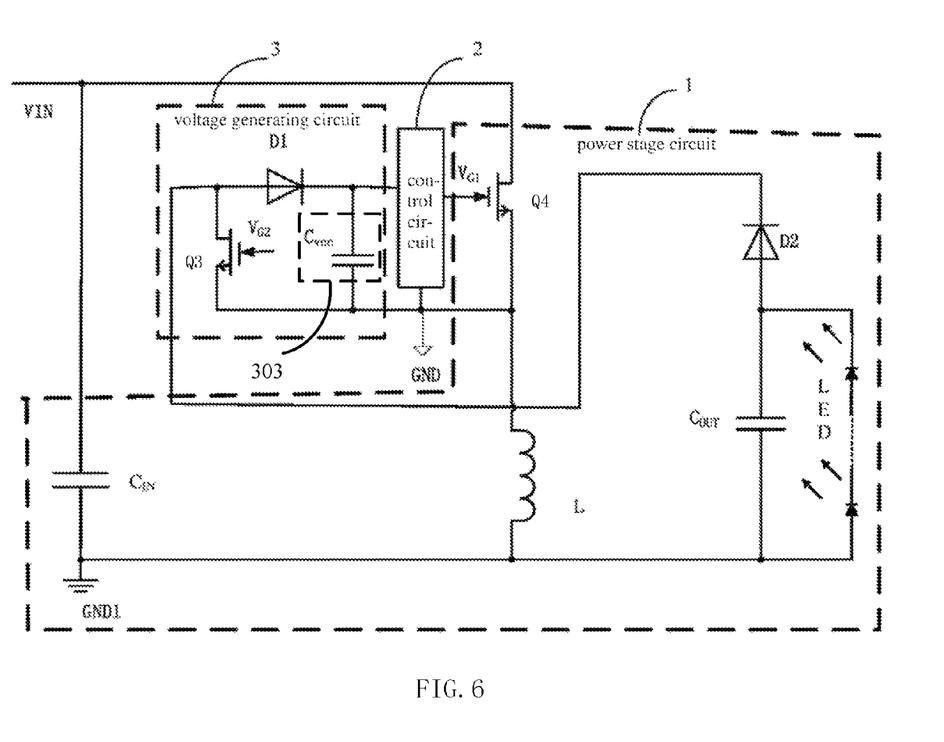
FIG. 6 is a schematic circuit diagram of a switching power supply according to another embodiment of the present disclosure.

FIG. 6 is a schematic circuit diagram of a switching power supply according to another embodiment of the present disclosure.

As shown in FIG. 6, the switching power supply according to another embodiment of the present disclosure includes a boost-buck-type power stage circuit.

A second diode D2 has a cathode which is electrically coupled to the anode of the first diode D1 in the supply voltage generating circuit 3.

A main power transistor Q4 has a first electrode terminal which is electrically coupled to an input voltage $V_{IN}$, a control terminal which is electrically coupled to an output terminal of the control circuit 2, and a second electrode terminal which is coupled to the first ground.

An inductor L has a first terminal which is electrically coupled to the second electrode terminal of the main power transistor Q4, and a second terminal which is electrically coupled to an anode of the second diode D2 through a load (LEDs).

A load-side capacitor $C_{OUT}$ has a first terminal which is electrically coupled to the second terminal of the inductor L, and a second terminal which is electrically coupled to the anode of the second diode D2.

An input capacitor $C_{IN}$ has a first terminal which is electrically coupled to the input voltage $V_{IN}$, and a second terminal which is electrically coupled to the second ground.

Figure 7:
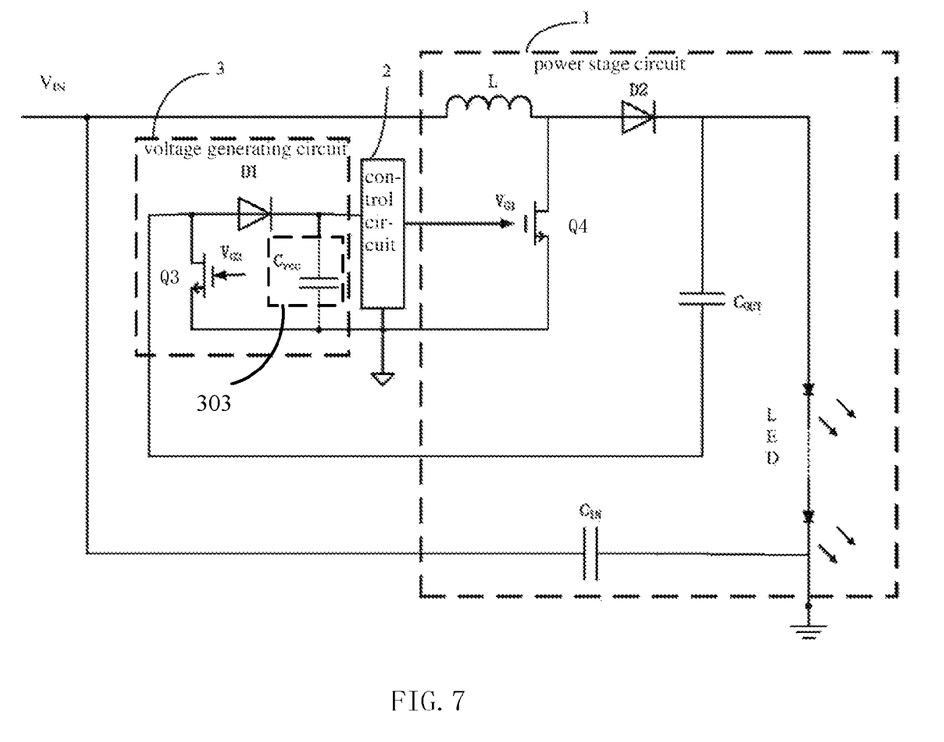
FIG. 7 is a schematic circuit diagram of a switching power supply according to another embodiment of the present disclosure.

FIG. 7 is a schematic circuit diagram of a switching power supply according to another embodiment of the present disclosure.

As shown in FIG. 7, the switching power supply according to another embodiment of the present disclosure includes a boost-type power stage circuit.

A second diode D2 has a cathode which is electrically coupled to the anode of the first diode D1 in the supply voltage generating circuit 3 through a load-side capacitor $C_{OUT}$, and an anode which is electrically coupled to the input voltage $V_{IN}$ through the inductor L.

A main power transistor Q4 has a first electrode terminal which is electrically coupled to the anode of the second diode, a control terminal which is electrically coupled to an output terminal of the control circuit 2, and a second electrode terminal which is coupled to the first ground.

An input capacitor C has a first terminal which is electrically coupled to the input voltage $V_{IN}$, and a second terminal which is electrically coupled to the second ground.

Moreover, the second electrode terminal of the main power transistor Q4 may be electrically coupled to the ground terminal (i.e., the first ground) of the control circuit 2. The main power transistor Q4 may be turned off completely when the main power transistor Q4 is turned off by the control circuit 2, without occurrence of resonance. The switching power supply is not adversely influenced by resonance, and has improved stability.

It should be noted that the main power transistor Q4 in the embodiment of the present disclosure may be a field effect transistor with one of source and drain as the first electrode terminal and the other of the source and the drain as the second electrode terminal.

Finally, it should also be understood that the relational terms such as "first", "second", and the like are used in the context merely for distinguishing one element or operation form the other element or operation, instead of meaning or implying any real relationship or order of these elements or operations. Moreover, the terms "comprise", "comprising" and the like are used to refer to comprise in nonexclusive sense, so that any process, approach, article or apparatus relevant to an element, if follows the terms, means that not only the element listed here, but also those elements not listed explicitly, or those elements inherently included by the process, approach, article or apparatus relevant to the element. If there is no explicit limitation, the wording "comprise a/an . . . " does not exclude the fact that other elements can also be included together with the process, approach, article or apparatus relevant to the element.

Various embodiments of the present disclosure have been described herein in a progressive way, by emphasizing differences between one embodiment and the previous embodiments. The same or similar parts may be read in the context of relevant embodiments.

The above description of various embodiments is given so that one skilled in the art can implement or utilize the present disclosure. Many modifications of these embodiments are obvious to one skilled in the art. General principles defined in the present disclosure may be implemented in other embodiments without departing from the spirit or scope of the present application. Thus, the present disclosure is not limited to the embodiments described herein, and may cover a broad scope which is consistent with the general principles described herein and is novel over the prior art.

What is claimed is:

1. A supply voltage generating circuit for providing a supply voltage to a power terminal of a control circuit in a switching power supply which has a power stage circuit comprising a main power transistor and a rectifying device, said supply voltage generating circuit comprising: a switching circuit, a unidirectional conduction circuit and an energy storage circuit,
   wherein said switching circuit has a first terminal being electrically coupled to a first terminal of said unidirectional conduction circuit and a current output terminal of said rectifying device, and a second terminal being coupled to a first ground,
   said unidirectional conduction circuit has a second terminal being coupled to said first ground through said energy storage circuit,
   in a time period during which said main power transistor is turned off, said switching circuit is turned off and a current provided by said rectifying device flows to said energy storage circuit through said unidirectional conduction circuit, in a case that said supply voltage is smaller than a predetermined voltage reference, and said switching circuit is turned on and said current provided by said rectifying device flows to said switching circuit, in a case that said supply voltage is larger than or equal to said predetermined voltage reference, and
   said supply voltage is a voltage produced by said energy storage circuit.

2. The supply voltage generating circuit according to claim 1, wherein said switching circuit comprises a third switch having a first terminal as said first terminal of said switching circuit and a second terminal as said second terminal of said switching circuit.

3. The supply voltage generating circuit according to claim 2, wherein said third switch is a transistor having a first electrode terminal as said first terminal of said third switch and a second electrode terminal as said second terminal of said third switch.

4. The supply voltage generating circuit according to claim 1, wherein said unidirectional conduction circuit comprises a first diode having an anode as said first terminal of said unidirectional conduction circuit, and a cathode as said second terminal of said unidirectional conduction circuit.

5. The supply voltage generating circuit according to claim 1, wherein said energy storage circuit comprises a capacitor having a first terminal as a first terminal of said energy storage circuit and a second terminal as a second terminal of said energy storage circuit.

6. The supply voltage generating circuit according to claim 1, wherein said switching circuit, said energy storage circuit and said control circuit are electrically coupled to said first ground.

7. A switching power supply, wherein said switching power supply comprises said supply voltage generating circuit according to claim 1, wherein: said control circuit controls on and off states of said main power transistor of said power stage circuit to generate an electric output signal at an output terminal of said switching power supply.

8. The switching power supply according to claim 7, wherein said main power transistor and said control circuit are electrically coupled to said first ground.

9. The switching power supply according to claim 7, wherein said power stage circuit has a boost-type topology or a buck-type topology or a boost-buck-type topology.

10. The switching power supply according to claim 9, wherein said electric output signal is a constant-voltage signal or a constant-current signal.

11. The switching power supply according to claim 7, wherein said rectifying device is a first diode with a cathode as said current output terminal.

12. The switching power supply according to claim 7, wherein said switching power supply comprises an input capacitor having a first terminal being coupled to an input voltage, and a second terminal being coupled to a second ground.

* * * * *